(No Model.)
H. OVENTROP.
SAW MILL DOG.
No. 262,824. Patented Aug. 15, 1882.
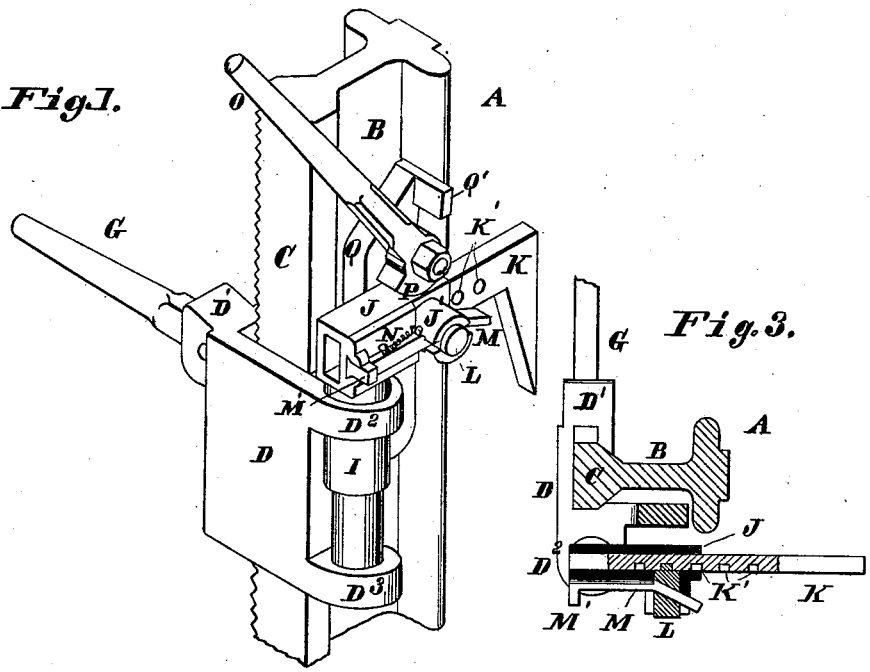
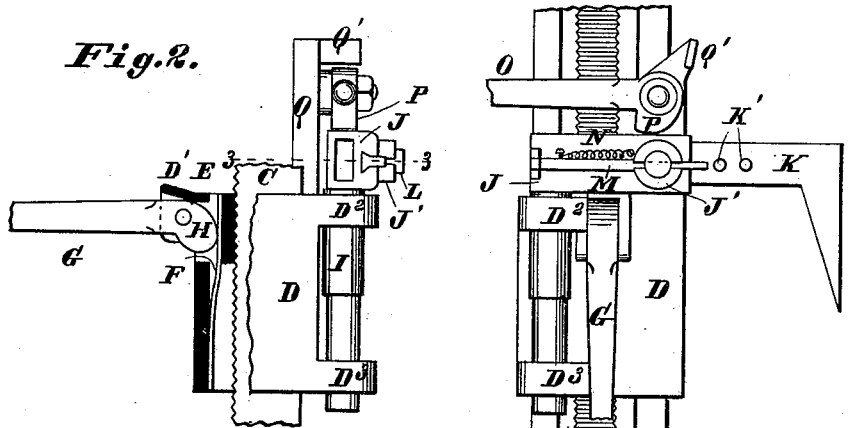
Attest.
Charles Pickles
B. M. Hopkins
Inventor:
Hermann Oventrop
By Knight Bros
atty

UNITED STATES PATENT OFFICE.

HERMANN OVENTROP, OF ST. LOUIS, MISSOURI.

SAW-MILL DOG.

SPECIFICATION forming part of Letters Patent No. 262,824, dated August 15, 1882.

Application filed May 31, 1882. (No model.)

*To all whom it may concern:*

Be it known that I, HERMANN OVENTROP, of the city of St. Louis, in the State of Missouri, have invented a certain new and useful Improvement in Saw-Mill Dogs, of which the following is a full, clear, and exact description, reference being had to the accompanying drawings, forming part of this specification, and in which—

Figure 1 is a perspective view. Fig. 2 is a detail back view, part in section. Fig. 3 is a horizontal section on line 3 3, Fig. 2; and Figs. 4 and 5 illustrate the manner of attaching my dog to the knee of a head-block not made especially for it.

My invention relates to a dog which is adjustable in length, so that when a log is first rolled onto the block the dog may be lengthened out to take a good hold of it, and when it has been slabbed the dog may be shortened up and brought close to the knee, out of the way of the saw.

A represents one of the knees of a saw-mill head-block. The knee, as usual, consists of two T-flanges connected by a web, B. The back flange, C, has one edge serrated or notched, and upon it is a vertically-adjustable block, D, which is held to its adjustment by means of a notched block, E, secured to the inside of the block D by a spring, F, and which is forced against the serrated edge of the knee by a lever, G, having an eccentric head, H, and being pivoted to an extension or projection, D', of the block D. As the dog is secured to this block D, it will thus be seen that it can be vertically adjusted to suit any size log. The block D has projections $D^2$ and $D^3$ to receive a vertical shaft, I, which can turn freely therein and also move vertically. Upon the top of this shaft is a square socketed sleeve, J, in which fits and works the adjustable dog K. The dog is held to its adjustment by a pin, L, working in a hole in the sleeve, and a projection, J', formed upon or secured thereto, whose inner end engages with holes K' in the dog. The pin L is held in contact with the dog, and is moved out by a runner-shaped piece, M, dovetailed into the side of the sleeve, as shown. The piece M is drawn back into the position shown by a spiral spring, N, and when it is in this position it holds the pin into engagement with the dog. By sliding the piece M endwise it will be seen that its outturned end will move the pin L out, disengaging it from and allowing the dog to be adjusted for the purpose stated. The outer end of the piece M has a projection, M', by which it is moved. When the dog has been placed in position upon the log it is forced down by a lever, O, having an eccentric head, P, which bears against the top of the sleeve. The lever is pivoted to an upward-extending arm, Q, formed upon or secured to the block D. Upon the top of the arm is a stop, Q', for receiving the lever when thrown back.

It will be seen that as the shaft I can turn freely in its bearings the dog can be thrown around horizontally away from the knee, so as not to be struck by a log being rolled on.

Should it be desired to attach my dog to saw-mills already in use, it can be easily done (see Figs. 4 and 5) by securing to an upright, R, suitably formed to fit in between the flanges of a knee and secured to the web B, a sliding block, D, to which the levers, dog, &c., would be secured, as in the other case.

I claim as my invention—

1. The combination of knee A, block D, provided with spring-block within it, and adjustable vertically on the knee, lever G, having eccentric head H for holding the block D to its adjustment, shaft I, turning in block D, adjustable dog K, and lever O, having eccentric head P, and adapted to depress the dog, as set forth.

2. The adjustable dog K, working in a sleeve, J, and being held to its adjustment by a pin, L, and sliding piece M, substantially as set forth.

3. The dog K, secured to the block D, by which it can be vertically adjusted, the block being connected to the serrated rib C of the knee A, and being held to its adjustment by a spring-block, E, and lever G H, substantially as set forth.

HERMANN OVENTROP.

Witnesses:
SAML. KNIGHT,
GEO. H. KNIGHT.